United States Patent
Straumanis

[11] 3,904,338
[45] Sept. 9, 1975

[54] SYSTEM AND METHOD FOR CONTROLLING A MACHINE CONTINUOUSLY FEEDING A SHEET TO INTERMITTENTLY ACTIVATED STATION

[75] Inventor: Maris Straumanis, Columbus, Ohio

[73] Assignee: Industrial Nucleonics Corporation, Columbus, Ohio

[22] Filed: Dec. 28, 1973

[21] Appl. No.: 429,676

Related U.S. Application Data

[63] Continuation-in-part of Ser. No. 222,103, Jan. 31, 1972.

[52] U.S. Cl. .............. 425/145; 425/171; 264/40; 425/326 R
[51] Int. Cl. .............................................. B29d 7/22
[58] Field of Search .......... 425/140, 141, 142, 145, 425/163, 169, 171, 326 R, 327; 264/40

[56] References Cited
UNITED STATES PATENTS

| | | | |
|---|---|---|---|
| 3,015,129 | 1/1962 | Hays et al. | 425/141 |
| 3,105,270 | 10/1963 | Fibish | 425/327 X |
| 3,131,425 | 5/1964 | Jacobs et al. | 425/142 |
| 3,286,302 | 11/1966 | Doering | 425/145 X |
| 3,307,215 | 3/1967 | Gerhard et al. | 425/141 |
| 3,465,384 | 9/1969 | Barchi et al. | 264/40 UX |

FOREIGN PATENTS OR APPLICATIONS 335,657  10/1930  United Kingdom ................ 425/140

OTHER PUBLICATIONS
Plastics Technology, Feb. 1972, TP 986.A1P75, pp. 37–39.

*Primary Examiner*—R. Spencer Annear
*Attorney, Agent, or Firm*—William T. Fryer, III; Allan M. Lowe

[57] ABSTRACT

An extruder continuously forms a sheet that is intermittently supplied to an intermittently activated, in-line processing station, e.g., a thermoformer. The sheet is supplied to the processing station via a variable accumulator that is adapted to have a rest state immediately prior to the sheet being supplied to the processing station. The extruder includes a screw for feeding material to sheet forming dies at a mouth of the extruder, as well as rolls for taking the sheet material away from the extruder mouth. The rest state time is measured to derive an indication of the take-away speed of the sheet from the mouth relative to the speed with which the sheet moves through the intermittently activated processing station. The activation rate of the processing station is measured, as is the thickness of the sheet after it has reached a set state, prior to passing through the accumulator. In response to the three measurements, the screw and line speeds are controlled so that the sheet thickness is maintained approximately at a setpoint value, and sufficient material is always available to the processing station, and excess material is prevented from piling up at the accumulator.

25 Claims, 7 Drawing Figures

SYSTEM AND METHOD FOR CONTROLLING A MACHINE CONTINUOUSLY FEEDING A SHEET TO INTERMITTENTLY ACTIVATED STATION

RELATIONSHIP TO CO-PENDING APPLICATION

The present application is a continuation-in-part of my co-pending application, Ser. No. 222,103, filed Jan. 31, 1972, entitled "Non-Interacting Extruder Control," and commonly assigned with the present application.

FIELD OF INVENTION

The present invention relates generally to sheet control systems and processes and more particularly to a system for and method of controlling a machine that continuously derives a sheet that is supplied to an intermittently activated in-line processor.

BACKGROUND OF THE INVENTION

In certain sheet processing systems, a sheet is continuously derived from a first machine and supplied to an intermittently activated processing station that is in line with the machine. To provide for a transition that results between the continuously derived sheet and the intermittent activation of the processing station, an accumulator is provided between the machine and processing station; typically, the accumulator is in the form of a spring biased or motor driven dancer roll that takes up slack between the continuous sheet feed from the machine and the intermittent feed to the processor. One system of this type includes a plastic extruder from which is continuously derived a sheet that is fed to a dancer roll, which in turn feeds the plastic sheet to an intermittently activated, in-line thermoformer for molding articles such as cups, lids, etc.

A problem with systems wherein a continuously derived sheet is fed to an intermittently activated, in-line processing station is that the relative speed of the sheet as it is derived from the machine may vary considerably relative to the speed of the sheet as it is being fed through the station. (The speed of the sheet moving through the processing station is defined herein, for the specification and claims, as the average sheet speed over one complete cycle time of the processing station, i.e., from the time the sheet begins to move through the station during a first cycle time to the time the sheet begins to move through the station during the next succeeding cycle time.) In response to the sheet speed through the processing station exceeding the take-away speed, i.e., line speed, of the sheet from the machine over a relatively long interval for relatively small differences in the two speeds or over a relatively short interval for a large difference in the two speeds, insufficient material is available to the processor and it becomes "starved". In contrast, if the take-away speed exceeds the processor speed, there can be a greater accumulation of material at the accumulator than the accumulator is capable of handling. In such an event, the sheet is likely to become damaged or destroyed by contacting a floor beneath the accumulator station, as well as by folding and twisting on itself in the region of the accumulator. Typically, in the prior art, operators were required to continuously monitor the sheet and manually control line speed to prevent the processor from being starved or to avoid excess sheet accumulation. Of course, operator inattention can have deleterious effects and often resulted in either the processor being starved or excessive sheet accumulation.

A further problem, particularly related to a plastic sheet extruder supplying an in-line intermittently activated processor, such as a thermoformer, is that operator induced changes in line speed have an effect on sheet thickness. However, one of the main criteria for manufacture of an extruded sheet, particularly sheets which are to be molded into plastic articles, is that the sheet thickness remains constant at a setpoint value. Generally, with prior art techniques it was not possible to maintain sheet thickness constant while varying line speed, except on an iterative, trial and error basis. Of course, iterative control of sheet thickness is to be avoided because the sheet is likely to be excessively thin or thick, with resulting deleterious product and raw material effects.

BRIEF DESCRIPTION OF THE INVENTION

In accordance with the present invention, the speed with which a sheet is continuously derived from a machine and supplied to an intermittently activated, in-line processing station is controlled in response to a measurement of the relative speeds of the sheet as it is derived from the machine and fed through the processor. An indication of the relative speeds is derived in accordance with one aspect of the invention, by measuring the rest time duration of a dancer roll included in an accumulator between the machine and the intermittently activated processing station. The accumulator is adjusted so it normally has a rest state immediately prior to the sheet being supplied to the processing station, thereby assuring the derivation of the speed measurement once each time the processor is activated. An indication is also provided, preferably in response to the measured relative speeds, of whether the relative sheet speeds are being maintained constant, or whether one of the sheet speeds is increasing relative to the other sheet speed. The indications of relative sheet speed and the direction of change of the sheet speed are preferably combined to control line speed such that slight excess sheet is always available to the intermittently activated processor. Thereby, the in-line processor is not starved and excessive sheet accumulation does not occur. By maintaining the slight excess, it is possible to maximize throughput, i.e., maximize the number of articles derived from the intermittently activated processing station, at the physical limit of the intermittently activated station.

If the intermittently activated station is a thermoformer, the physical limit is subject to change because of variable factors relating to the time required for a thermoformer mold to open in response to variations of air pressure supplied to an actuator for opening the mold. Thereby, in response to the thermoformer cycle time increasing, with an attendant decrease in the speed of the sheet through the thermoformer, the line speed is adjusted downwardly to prevent the deleterious effects of sheet pile up in the vicinity of the accumulator. On the other hand, in response to the thermoformer cycle time decreasing the line speed is increased to maintain the excess sheet condition at the accumulator.

However, in certain instances it is not desirable or possible to maintain the excess sheet condition at the accumulator. In such an event, the activation rate of the intermittently activated processor is measured and compared with a setpoint value therefore to derive an error signal for controlling the line speed. The processing system of the present invention automatically determines if line speed is to be controlled in response to the error signal for the activation rate or in response to the measurement of relative speed of the two sheets, to provide throughput maximization control. In particular, the system automatically switches to the line speed commensurate with the lesser of the two values, i.e., the setpoint value for activation rate or the physical limit of the intermittently activated device.

As a further feature of the invention, the sheet thickness is concomitantly controlled with line speed changes, whereby the sheet thickness is maintained at a constant, setpoint value. To this end, a sheet thickness gauge is provided downstream of the extruder mouth and upstream of the accumulator, where the sheet is in a relatively set state. The thickness measurement is combined with the signals for line speed control to enable the feed rate of material to the extruder and take-away speed from the extruder to be concomitantly controlled. Such concomitant control of line speed and sheet thickness by varying screw speed and line speed is disclosed in my previously mentioned co-pending application.

It is, accordingly, an object of the present invention to provide a new and improved system for and method of controlling the speed of a sheet continuously derived from a machine and fed to an in-line, intermittently activated processor.

Another object of the invention is to provide a new and improved device for measuring the speed of a sheet continuously derived from a machine relative to the speed with which the sheet is fed through an intermittently activated processor in line with the machine.

Another object of the invention is to provide a new and improved system for and method of controlling an extruder feeding an in-line intermittently activated device wherein the thickness of the sheet is maintained relatively constant while throughput of product derived from the intermittently activated processor is maximized.

A further object of the invention is to provide a new and improved system for and method of controlling the speed of a sheet continuously derived from a machine and supplied to an intermittently activated processor via an accumulator, wherein excess sheet is not piled up in the vicinity of the accumulator and the processor is not starved for sheet.

An additional object of the invention is to provide a new and improved system for and method of automatically maintaining excess sheet at an inlet of an intermittently activated processor that is in line with a machine which continuously derives the sheet.

Yet another object of the invention is to provide a new and improved system for and method of automatially controlling throughput of a machine that continuously derives a sheet that is supplied to an intermittently activated in-line processor such that automatic control to the lesser of two limits, a setpoint activation rate for the processor or the physical limit of the processor, is automatically provided.

A further object of the invention is to provide a new and improved control system and method for controlling a plastic sheet extruder and an in-line thermoformer wherein sheet thickness is maintained substantially constant and throughput is maximized.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

The drawing illustrates the various control blocks as if they were analog and digital computer type blocks. The various control blocks may, however, be segments of a properly programmed, general purpose digital computer. The blocks are shown in analog form to facilitate the presentation. The various operations indicated in the blocks may be performed by the digital computer in its arithmetic unit in response to signals stored in the computer memory. Any skilled programmer could program the digital computer in a manner to effect the results of the various control blocks.

Operations are performed on three different time bases. The longest time base is commensurate with the time required for a gauge to scan between edges of a moving sheet, a time interval generally on the order of 30 seconds to one minute. A second, intermediate time base is a basic computation cycle, typically having a duration of 5 seconds. Each of the 5 second intervals is divided into 50 equal intervals, each having a duration of 0.1 second, to provide the shortest time base. Output signals are derived from the computer and supplied to actuators to control the on-time of the actuators as a percentage of the 5 second interval. Hence, for example, if a signal derived during a five second period indicates that an actuator should be driven to one-half of the maximum allowable change during a 5 second interval, 25 pulses are supplied by the computer to the actuator during the 5 second interval.

Figure 1:
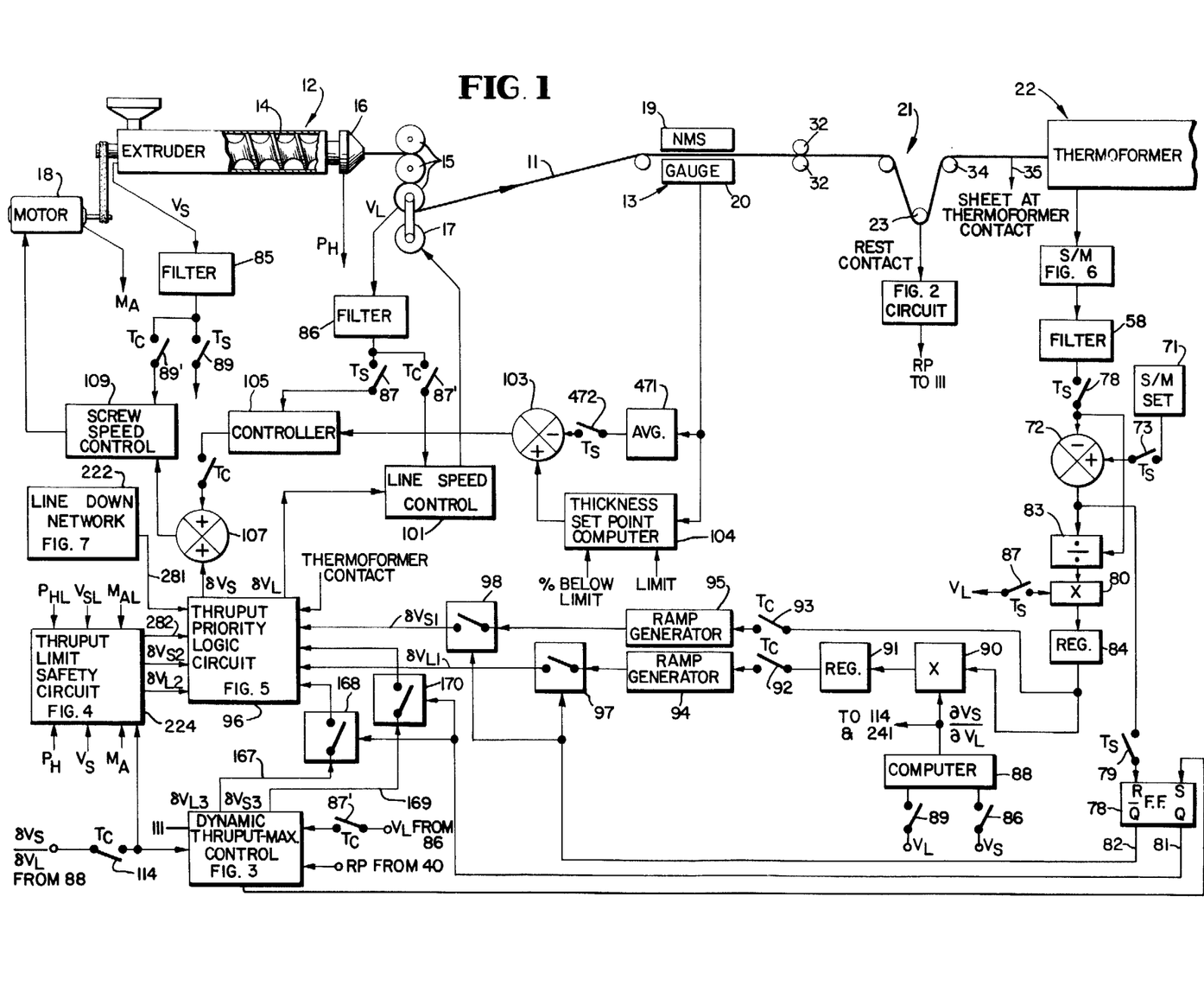
FIG. 1 is a block diagram of a preferred embodiment of the invention.

Reference is now made specifically to FIG. 1 of the drawing wherein there is illustrated a block diagram of a system for controlling the thickness and throughput of a plastic sheet 11 formed by plastic sheet extruder machine 12, of the type disclosed in U.S. Pat. No. 3,015,129 to Hays et al. Extruder 12 and the material therein are such that plastic sheet 11 is deformable as it is fed to chrome or chill rolls 15 from die head 16. Throughput of the extruder machine is thereby dependent upon the take-away, i.e., line speed, of sheet 11, $V_L$, from extruder 12, which in turn is responsive to the rotational velocity of rolls 15. Throughput is also dependent on the weight per unit area of sheet 11, which is equivalent to sheet thickness, T, since sheet density is constant. The thickness of sheet 11 is maintained relatively constant by concomitantly controlling the speed, $V_S$, of screw 14, which determines the feed rate of raw plastic material to die head 16, and the sheet line speed in response to measurements of sheet thickness by noncontacting, scanning thickness gauge 13 and the values of $V_L$ and $V_S$, as disclosed in my previously mentioned co-pending application. Gauge 13 is positioned downstream of rollers 15 at a point where the sheet has been cooled sufficiently to be set, i.e., where the sheet is no longer deformable in response to being pulled. One other factor affecting throughput is sheet width, which can be considered constant since knives (not shown) are provided to trim the sheet edges. Throughput of the extruder machine of FIG. 1 can therefore be determined from $V_L T$.

Throughput is controlled by varying the speed of chrome or chill rollers 15 through which the formed plastic sheet 11 traverses after the sheet has left extruder 12 at die head 16. The speed of chill rollers 15 is controlled by drive motor 17 therefor, which in turn controls the throughput rate of sheet 11. The rotational rate of screw 14, which determines the feed rate of plastic material to extruder 12, is controlled in response to the speed of motor 18.

Downstream of gauge 13, in seriatim, are sheet accumulator 21 followed by an in-line intermittently activated sheet processor station 22, which preferably comprises an oven and thermoformer. Accumulator 21 preferably includes a spring or motor driven dancer roll 23 which takes up slack in sheet 11 due to the continuous speed of the sheet as it is derived from extruder 12 and rolls 15 and enables the sheet to be intermittently supplied to intermittently activated oven and thermoformer station 22.

Station 22 is a conventional, intermittently activated device including means for intermittently advancing a predetermined length, e.g., 2 feet, of sheet 11 to an oven that is upstream of a mold where the sheet is formed into discrete articles, such as cups, lids, covers, etc. In the oven, the sheet is melted to a certain extent so that the molding operation does not damage the sheet. In the mold, the sheet is maintained in a stationary state after having been indexed forward into the mold. While the sheet is stationary, the mold is closed, then bleed and main vacuums are applied to the mold, after which a blow forming operation occurs. Thereafter, the product is cooled and the sheet is again stabilized. After the sheet has been stabilized, the mold opens and if an adequate supply of sheet is present in accumulator 21 the indexing operation is reinitiated. Each of the operations associated with the oven and thermoformer station 22 from the indexing of the sheet to the cooling of the formed product has a predetermined time duration controlled by the operator setting certain timers included in the thermoformer. However, the time required for the mold to open is variable and subject to drift because air is generally utilized as a motive force for lifting the mold and the air supply pressure is subject to considerable variations during the course of a day. Also, the period following opening of the mold until the next indexing operation, i.e., the wait until adequate sheet is available from accumulator 21, may be subject to variations. One of the objects of the present invention is to eliminate or minimize the waste period between mold openings and the next indexing operation so that increased throughput can be obtained.

Dancer roll 23 is adapted to oscillate vertically depending upon the length of sheet 11 derived from the machine comprising extruder 12 and ther requirements of intermittently activated station 22. In the FIG. 2 embodiment, dancer roll 23 is fixedly attached to spring 30 that is suspended from the ceiling above the dancer roll. For preferred operation, dancer roll 23 is maintained at a lower limit, rest point for approximately a predetermined time interval immediately prior to each forward indexing operation of sheet 11 into station 22. Thereby, a fixed sheet excess is maintained in accumulator 21 and station 22 can operate at its physical limit since the integral of the speed of sheet 11 as it is derived from extruder 12 and cold rolls 15 is slightly in excess of the integral of the speed with which the sheet moves through station 22.

Figure 2:
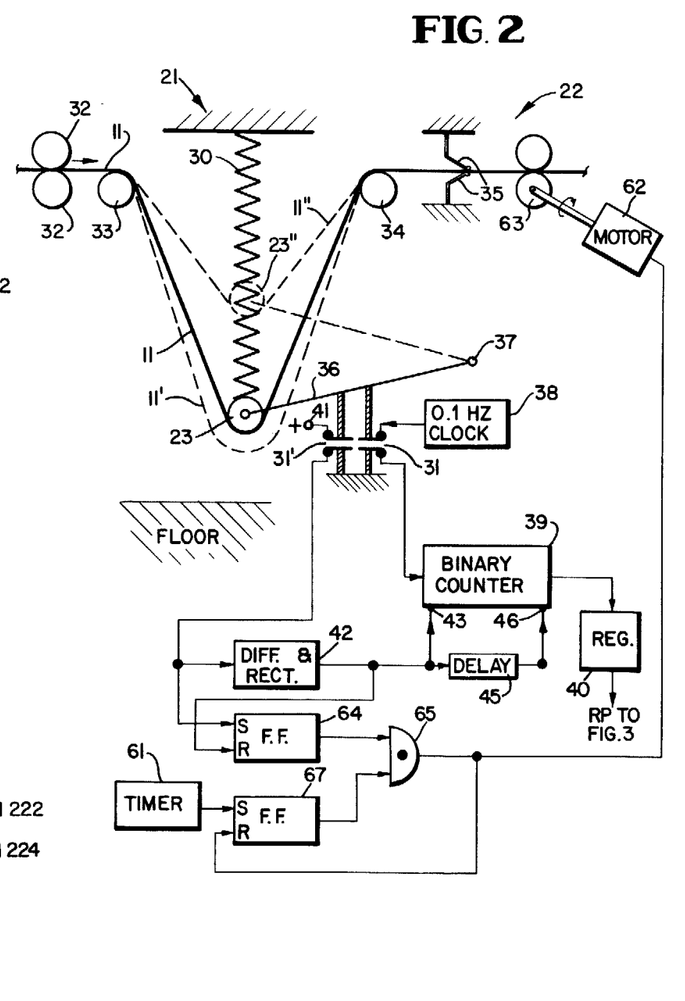
FIG. 2 is a schematic diagram of a preferred embodiment for measuring the relative speed of the continuously derived sheet and the intermittently advanced sheet.

To monitor the speed with which sheet 11 is derived from extruder 12 relative to the speed of the sheet as it moves through station 22, as well as to derive an indication of sufficient sheet being available to be indexed into station 22, dancer roll 23 is mechanically coupled to two pairs of normally open switch contacts 31 and 31', FIG. 2, which are closed in response to the dancer roll reaching the rest position at the bottom of its travel. In response to dancer roll 23 coming to the rest position and contacts 31' closing, a signal is supplied to indexing motor 62 at station 22 to index sheet 11 a predetermined fixed length from accumulator 21 to station 22. The length of time that switch contacts 31 are in a closed state indicates the duration of the rest period and the rate of change of rest period indicates the speed with which the sheet 11 is continuously derived from extruder 12 relative to the speed of the sheet as it is processed at station 22.

Sheet 11, prior to reaching accumulator station 21, passes between pull rolls 32 that are upstream of accumulator 21 and downstream of gauge 13. From pull rolls 32 sheet 11 passes over guide roll 33 and thence to dancer roll 23 and oven guide roll 34. Sheet 11 passes around oven guide roll 34 and between motor driven pull rolls 63 into the oven included at station 22. At the mouth of the oven the sheet 11 passes between a pair of fixedly mounted, spring biased microswitch contacts 35 which are closed when no sheet is between them. Closure of switch contacts 35 results in a binary one signal being supplied as a safety to data processing apparatus described infra to indicate that no sheet is at the input of the thermoformer station 22 and that system operation should be aborted.

Dancer roll 23 is fixedly mounted at one end of rigid bar 36, the other end of which is pivotable about pivot point 37. Connected to bar 36 intermediate of the ends thereof are the two sets of dancer roll contacts 31 and 31'. One contact of each of contact pairs 31 and 31' is fixedly mounted, while the other contact of each contact pair is mounted on bar 36. In response to bar 36 being rotated about pivot point 37 sufficiently so that the dancer roll 23 is in the rest position, at the bottom of its travel, contacts 31 and 31' close.

Closure of contacts 31 results in pulses from clock source 38, preferably having a frequency of 0.1 Hertz, being supplied to binary counter 39, the contents of which are read out to register 40 thereafter cleared upon the completion of each rest period. Thereby, counter 39 provides an indication, in binary coded form, of the length of each rest period. To this end, one of contacts 31' is connected to a positive d.c. source at terminal 41, while the remaining contact 31' is connected to a circuit 42 including a differentiator connected to a rectifying network for deriving a relatively short duration pulse in response to switch contacts 31' opening. The pulse derived from circuit 42 is applied to readout control terminal 43 of counter 39, causing the count stock in the counter to be read into register 40. After the contents of counter 39 have been read out, the pulse derived from circuit 42 is applied through delay network 45 to clear terminal 46 of counter 39, thereby enabling the counter to provide an indication of the dancer roll rest period duration the next time the rest period is detected.

In response to the speed of sheet 11 as it is derived from extruder 12 being sufficiently in excess of the speed with which the sheet moves through station 22, excess sheet is at accumulator 21, as indicated by the dotted line 11', which shows the sheet being below the lowest point of dancer roll 23. In contrast, there is no substantial excess sheet when dancer roll 34 drops to its lowest point, as shown by the solid line position of sheet 11 snugly against dancer roll 23 and in a taut position between the dancer roll and guide rolls 33 and 34. When the sheet 11 has been indexed into station 22, the sheet and dancer roll rise to positions indicated by dotted lines 11" and 23", with the bias of spring 30 being overcome by the force exerted by the sheet on the bottom of the dancer roll. Of course, the sheet is in a taut position between the dancer roll 23 and guide rolls 33 and 34 when the sheet is at the position indicated by reference numeral 11".

Control of indexing for sheet 11 into station 22 occurs when sufficient sheet is at accumulator 21 provided the thermoformer is ready for the sheet. The determination as to whether the thermoformer is ready for the sheet is provided by a thermoformer timer 61 that is set by the operator for a period equal to the time duration of one cycle of the thermoformer. Timer 61 derives a pulse each time the thermoformer mold is opened. This output is combined with the positive output voltage of contact 31' to derive a further pulse that actuates indexing motor 62. Each time the further pulse is applied to motor 62, pull roll 63 advances a predetermined length of sheet 11 into station 22.

To derive the further pulse, the positive output voltage of contact 31' is applied to a set input terminal of flip-flop 64. In response to the voltage from contact 31, flip-flop 64 is activated to the set state to derive a binary one output signal. Flip-flop 64 remains in the set state until contacts 31' open, at the end of the rest period, at which time the flip-flop is reset in response to the output of network 42 being connected to the flip-flop reset input terminal. The binary one output signal of flip-flop 64 is fed to one input terminal of AND gate 65, having a second input that has a binary one level over the interval from and output being derived from timer 61 until contact 31' opens. To this end, the output of timer 61 is connected to the set input terminal of flip-flop 67. When flip-flop 67 is in the set state, a binary one is derived from it and supplied to the second input terminal of AND gate 65. The output signal of AND gate 65 is coupled to a reset input terminal of flip-flop 67, with appropriate delay if necessary, whereby the flip-flop is activated to the reset state and can be responsive to the next output pulse of timer 61. The binary one output level of AND gate 65 is also applied as the further pulse to indexing motor 62, whereby the indexing motor is activated in response to the leading edge of the output of timer 61 when sufficient or excess sheet is available at accumulator station 21 prior to the timer cycle being completed. In the alternative, indexing motor 62 is activated in response to the accumulation of sufficient sheet at station 21 if such an accumulation occurs after the leading edge of a pulse from timer 61 has occurred.

Figure 6:
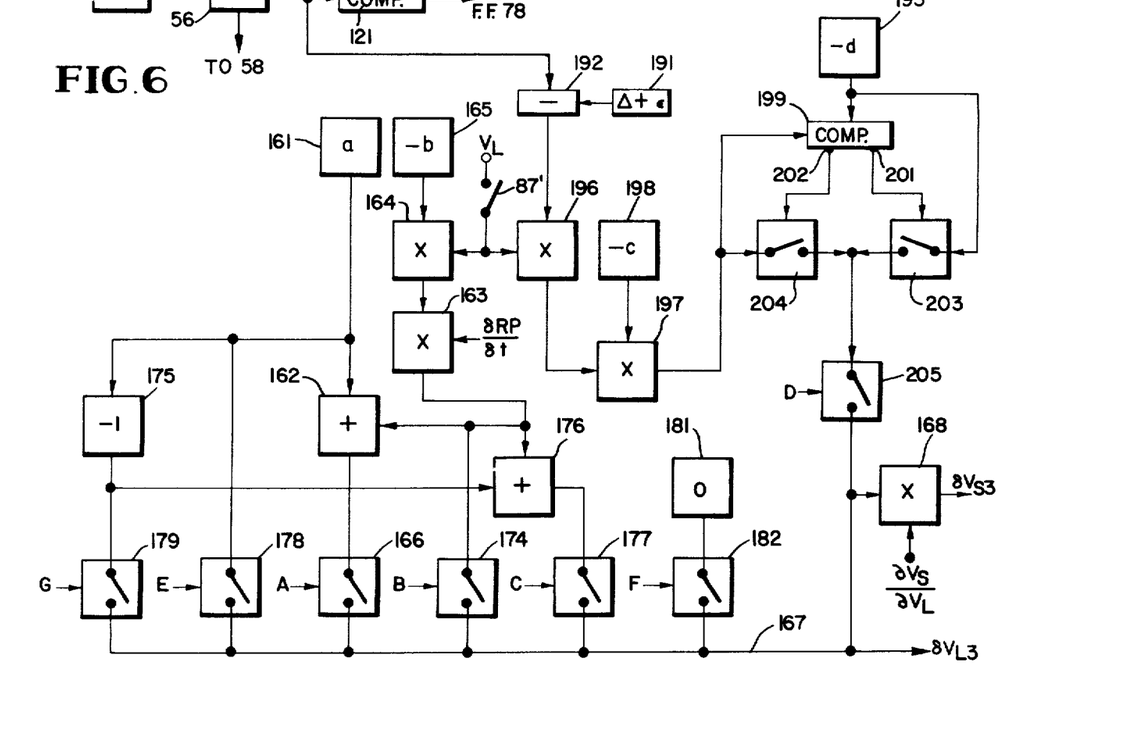
FIG. 6 is a schematic diagram of an embodiment of a thermoformer shots per minute calculation circuit included in the FIG. 1 system.

To provide selective control for the line speed, it is necessary to measure the activation rate of intermittently activated processor station 22. To this end, as illustrated in FIG. 6, processor station 21 includes normally open circuited microswitch contacts 49 and 49' generally included on commercially available thermoformers, which contacts are closed with each rise of the upper mold of the thermoformer. The time interval between adjacent closures of contacts 49 is measured by counting the number of pulses from clock source 38 in counter 48. To this end, one of contacts 49 is connected to a positive d.c. voltage at terminal 51 and the remaining one of contacts 49 is connected to a differentiating network 52 that derives a short duration positive pulse each time contacts 49 close and 0.1 Hertz clock source 38 is connected to a count input of counter 48 through contacts 49'. The short duration positive pulse derived from differentiator 52 is supplied to readout terminal 53 of counter 48. Counter 48 is subsequently reset, prior to the derivation of the next pulse from source 38, by supplying a short duration pulse to the counter reset terminal 54 of counter 48 via delay network 55. Thereby, each time contacts 49 close a binary output signal is derived from counter 48 to indicate the time interval (in tenths of seconds) between adjacent activations (frequently referred to as shots) of the thermoformer at station 22. The signal derived from counter 48 is supplied as a multi-bit, parallel signal to register 57 which supplies a divisor input terminal of division matrix 56. Matrix 56 includes a dividend input responsive to a binary signal from source 68, having a value commensurate with the value of 600. Thereby, division matrix 56 derives a parallel, multi-bit binary output signal having a value indicative of the activation rate, in shots per minute, of the thermoformer at station 22.

The shots per minute signal derived from division matrix 56 is supplied to a well known digital filter 58, FIG. 1, having properties similar to those of an analog low pass filter. The filtered value is continuously updated, once each second, in accordance with:

$$\overline{X}(t) = A\,\overline{X}(t-1) + (1-A)\,X(t)$$

(1)

where:

$\overline{X}(t)$ = current filtered value of shots per minute, $\overline{X}(t-1)$ = filtered value of shots per minute after last calculation of $\overline{X}(t)$, $A = \exp(-1/\text{filtering time constant})$, $X(t)$ = "current value" of shots per minute.

To enable various additional operations associated with the apparatus of FIG. 1 to be performed, it is necessary to monitor with conventional transducers and analog to digital converters, as required, the speed, $V_s$, of screw 14, the pressure, $P_H$, of plastic material in die head 16, the line speed, $V_L$, as determined by the rotational velocity of rollers 15, and the load on screw 14, as reflected in the current, $M_A$, supplied to motor 18 that drives the screw, and the thickness of sheet 11 as monitored by gauge 13. Thickness gauge 13, in one embodiment, responds to the density of sheet 11 passing between a penetrating radiation source 19 and a radiation detector 20. Since the plastic sheet 11 has a constant density, the output signal of gauge 13 is a signal level commensurate with the thickness of the area of sheet 11 over which gauge 13 traverses. Gauge 13 supplies an output signal to averaging network 471 which, upon the completion of a scan of gauge 13 across sheet 11, derives a scan average sheet thickness signal that is read out by momentary closure of sampling contact 472. The various signals derived from the transducers are filtered in accordance with Equation (1), as appropriate, and stored in a computer memory or appropriate register so that operations can be performed in response to the stored signals prior to initiation of the next scan of gauge 13. In the alternative, certain operations are performed during a scan of gauge 13 once each basic computation cycle.

In particular, in response to the line speed of sheet 11 exceeding the speed with which the sheet is fed through station 22, and thus providing excess sheet at accumulator 21, line speed and screw speed are controlled in response to computations made once every basic computation cycle. If, however, sheet is advanced through the thermoformer at a speed higher than the line speed of sheet 11, control is performed only after each scan of gauge 13. If a transition occurs during a scan of gauge 13 between the sheet edges so that excess sheet is detected during a scan, the system automatically switches from control once a scan to control once a basic computation cycle. When control is being performed once a basic computation cycle, a determination is made at the end of each scan as to whether such control should be continued by determining if the actual number of actuations of the thermoformer at station 22 (shots per minute) is greater than a setpoint for shots per minute. The setpoint for shots per minute is not necessarily equal to the number of shots per minute at which the operator has set the thermoformer timers to operate, but is based on criteria such as the capacity of chill rolls 15, the wear of the termoformer at station 22, the quality of the articles being produced by the thermoformer and other factors which are observed by the operator. The shots per minute setpoint is thereby subject to considerable variation relative to the relatively constant physical setup of the thermoformer cycle time, as governed by timers included in the thermoformer.

When control is being performed once a scan of gauge 13, the system is considered as operating under phase one control and throughput is in accordance with the shots per minute setpoint value. When control is once every basic computation cycle, the system is considered as being under phase two control and throughput maximization is provided since the speed of the thermoformer operation is governed by the amount of excess sheet 11 supplied to accumulator station 21. As indicated supra, the conflicting interests of shots per minute (phase one) and throughput maximization control (phase two) are resolved by always controlling line speed, and therefore throughput, to the lesser of the two values.

Figure 3:
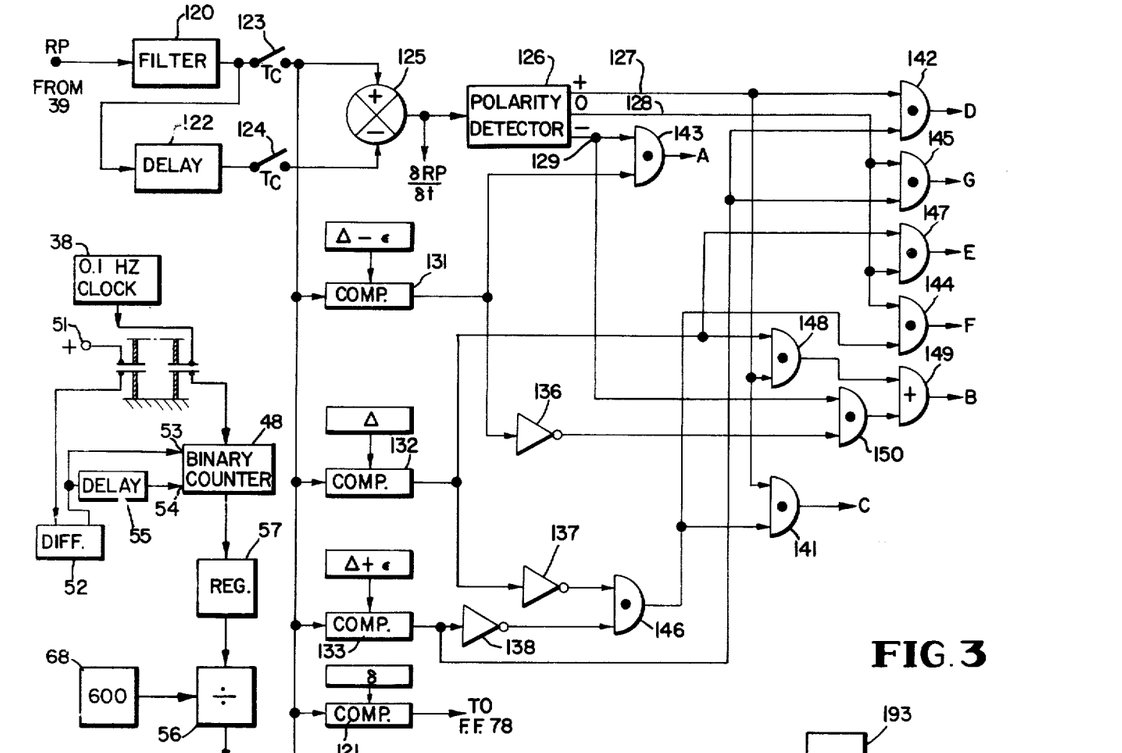
FIG. 3 is a block diagram of a preferred embodiment of apparatus that could be employed for determining dynamic throughput maximization control in the FIG. 1 system.

To provide for automatic switching between phases one and two, the output signal of comparator 121, FIG. 3, which has a binary one value in response to the filtered rest period exceeding a predetermined minimum, $\delta$, is combined with an indication of the relative value of measured shots per minute and shots per minute setpoint, the latter operation being performed once per scan of gauge 13. The relative values of the measured shots per minute and a shots per minute setpoint is determined once a scan of gauge 13 by supplying parallel, multi-bit binary signals from filter 58 and setpoint source 71 to minuend and subtrahend input terminals of subtraction matrix 72 via switches 73 and 74 which are closed after each scan of gauge 13 has been completed. Thereby, matrix 72 derives a binary, multi-bit, parallel error signal having a polarity indicating bit and a number of magnitude indicating bits for the relative values of the measured and setpoint shots per minute. The polarity indicating bit derived from matrix 72, which has a binary one value in response to the difference output of network 72 being negative to indicate that the measured shots per minute exceeds and setpoint shots per minute, is applied to a reset input terminal of flip-flop 78 via switch 79.

Switch 79 is closed once after each scan of gauge 13, whereby flip-flop 78 can be reset once per cycle depending upon whether the shots per minute setpoint exceeds the measured shots per minute over the previous scan time of gauge 13. Flip-flop 78 is activated to the set state immediately upon the detection of excess sheet in response to a binary one output level from comparator 121, FIG. 3, being coupled to the flip-flop set input terminal. Flip-flop 78 includes a pair of complementary output terminals 81 and 82 on which are derived binary one levels in response to the flip-flop being respectively in the set and reset states. With flip-flop 78 being in the set state, a binary one level derived at terminal 81 activates switches enabling phase two operations to be performed, while phase one operations are performed in response to a binary one level being derived at terminal 82.

For phase one operation, proportional line speed control is provided based on an error between measured and setpoint values of shots per minute, as a percentage of filtered shots per minute. To these ends, filtered shots per minute and shots per minute error binary signals derived from filter 58 and subtraction matrix 72 are supplied to dividend and divisor inputs of division matrix 83 which derives a binary output signal having a value commensurate with the total change in line speed to be made. The output signal of division matrix 83 and filtered line speed, $V_L$, coupled once a scan through switch 87, are supplied to multiplication matrix 80. The output signal of multiplication matrix 80 is supplied to register 84, whereby register 84 stores for one scan of gauge 13, a signal magnitude in accordance with:

$$\left\{ \frac{\frac{S}{M_{SET}} - \frac{S}{M}}{\frac{S}{M}} \right\} V_L \quad (2)$$

where:

$(S/M_{SET})$ = shots per minute setpoint, and (S/M) = measured shots per minute as filtered over the last scan of gauge 13 across the sheet, and $V_L$ = filtered line speed To determine the screw speed change which should accompany the line speed change so that sheet thickness remains substantially constant, the line speed change signal stored in register 84 is multiplied with a signal proportional to the rate of change of screw speed with respect to line speed, as computed for the last scan of gauge 13. The computation of rate of change of screw speed with respect to line speed is in accordance with the same model equation as is set forth in my previously mentioned co-pending application, namely:

$$T = K_0 + K_1 \frac{V_s}{V_L} + K_2 \frac{V_s}{V_L^2} \qquad (3)$$

where:

T = sheet thickness, $V_s$ and $V_L$ are defined supra, and $K_0$, $K_1$ and $K_2$ are constants determined for each extruder machine and associated apparatus, as ascertained by a regression analysis from measurements made on the machine. The rate of change of screw speed with respect to line speed is determined from Equation (3) as:

$$\frac{\delta V_s}{\delta V_L} = - \frac{V_s(K_1 V_L + 2K_2)}{V_L(K_1 V_L + K_2)} \qquad (4)$$

A signal having a value equal to the rate of change of screw speed with respect to line speed, as indicated by Equation (4), is derived once every scan by feeding filtered values of screw speed and line speed, $V_s$ and $V_L$, as derived from filters 85 and 86 (identical to filter 58) through switches 87 and 89 which are closed at the end of each scan of gauge 13 across sheet 11. The values of $V_s$ and $V_L$ are combined to solve the algebraic expression of Equation (4) in digital computer 88 which includes appropriate addition, multiplication, and division matrices to solve the expression of Equation (4), as well as a register for storing the computed partial derivative of screw speed with respect to line speed. The binary signal derived from computer 88 is multiplied with the signal stored in register 84, equal in magnitude to $\Delta V_L$ (the total line speed change to be made during the next scan of gauge 13), in multiplication matrix 90 which derives an output signal having a value $$\Delta V_s = \Delta V_L \times \frac{\delta V_s}{\delta V_L}.$$

The output signal of multiplier matrix 90 is supplied to register 91, where it is stored for a complete scan of gauge 13 across the sheet.

The $\Delta V_s$ and $\Delta V_L$ signals stored in registers 84 and 91 are thereby derived from the registers over a complete scan of gauge 13. The $\Delta V_s$ and $\Delta V_L$ values stored in registers 84 and 91 are inspected during each basic computation cycle in response to closures of switches 92 and 93 and fed to ramp generators 94 and 95 which derive signals $\delta V_{L1}$ and $\delta V_{S1}$, indicative of the size of step changes to be made within each basic computation interval. Signals derived from ramp generators 94 and 95 are selectively coupled to priority logic network 96 in response to switches 97 and 98 being closed with the system in phase one operation, as indicated by a binary one output level at reset output terminal 82 of flip-flop 78.

With the system in phase one operation and no safetys being extant (as described infra), the $\delta V_{L1}$ and $\delta V_{S1}$ signals coupled through switches 97 and 98 provide concomitant control for the line speed of sheet 11 and speed of screw 14 while maintaining the thickness of sheet 11 constant, without iterative type operations. To these ends, the $\delta V_{L1}$ signal coupled through switch 97 is applied through logic network 96 to one input terminal of line speed controller 101, having a second, feedback input terminal responsive to measured, filtered line speed, as derived from filter 86 and coupled once each basic computation cycle through switch 87 to controller 101. Controller 101 responds to the change of line speed signal supplied thereto and the instantaneous value of line speed and comprises a well known direct digital controller for the drive speed of motor 17 for chrome rolls 15 and thereby control the speed of sheet 11 as it is pulled from extruder 12.

The $\delta V_{S1}$ signal coupled through switch 98 is combined with a signal indicative of the amount which the speed of screw 14 should be changed to achieve constant thickness of sheet 11. The signal indicative of the screw speed setpoint change is derived by combining the signal coupled once per scan through switch 472 with a thickness setpoint signal. The measured thickness and setpoint thickness signals are respectively applied to minuend and subtrahend inputs of subtraction matrix 103. The thickness setpoint signal can be derived on a predetermined basis, or controlled as a statistical function of data derived from gauge 13, as disclosed in the so-pending, commonly assigned application of Somerville et al, Ser. No. 346,034, filed Mar. 29, 1973, for "Control System For Average Value Setpoint." In the latter case, the output signal of gauge 13 is supplied to thickness setpoint optimization controller 104, which is also responsive to operator input signals indicative of setpoint values for a minimum or limit value of thickness and a desired percentage of sheet thickness below the limit. Matrix 103 derives a multibit, parallel, binary output signal having a value indicative of the difference between the output signal of controller 104 and the signal fed through switch 472.

The difference signal magnitude derived from matrix 103 is supplied to sheet average thickness controller 105, which is also responsive once per scan of gauge 13 to the filtered line speed signal derived from filter 86, as coupled through switch 87. Network 105 responds to the value of filtered line speed to compute the rate of change of screw speed with respect to sheet thickness in accordance with:

$$\frac{\delta V_s}{\delta T} = \frac{V_L^2}{K_1 V_L + K_2} \qquad (5)$$

The magnitude of the signal indicated by Equation (5) is multiplied by the thickness error signal ($\Delta T$) derived from difference matrix 103 whereby network 105 derives a signal for the total screw speed change due to thickness error for a scan of gauge 13 in accordance with:

$$\Delta V_s = \frac{V_L{}^2}{K_1 V_L + K_2} \Delta T \qquad (6)$$

The magnitude indicated by Equation (6) is applied to a ramp generator included in network 105 and derived as a signal magnitude $\delta V_s$ for one scan of gauge 13 across sheet 11. The $\delta V_s$ signal derived from network 105 is sampled once during each basic computation cycle and added to the $\delta V_{S1}$ signal coupled through switch 98 in addition matrix 107 which derives an output signal indicative of the total screw speed change to be made during each basic computation cycle. The output signal of matrix 107 is combined with the filtered value of screw speed, as derived from filter 85 once each basic computation cycle, by supplying the output signal of filter 85 through switch 89′ to screw speed controller 109 which is also preferably a direct digital controller. Direct digital controller 109 derives an error signal which controls the rotation rate of motor 18, and therefore the speed of screw 14, as well as the feed rate of plastic material through extruder 12 to die head 16.

Consideration is now given to the operations performed while the system is in phase two, as well as the apparatus for performing the operations. In phase two, it is desired to maintain the line speed of sheet 11 a predetermined amount greater than the speed with which sheet moves through thermoformer station 22. However, such a situation implies an unstable condition at accumulator 21 because, eventually, excess sheet is accumulated with the deleterious effects mentioned supra. Thereby, the line speed of sheet 11 cannot be maintained at a predetermined value above the speed with which sheet is fed into station 22, but the line speed preferably periodically exceeds the speed of sheet into station 22 so as to maintain a deadband range or amount on either side of a nominal value of excess sheet at the accumulator 23.

The measurement of the rest period of dancer roll 23, which indicates the line speed of sheet 11 relative to the speed with which the sheet moves through station 22, provides a facile technique for controlling line speed. A particular rest period time ($\Delta$) is associated with the nominal excess sheet at the accumulator 23. The deadband extends on either side of the nominal rest period and thereby has boundaries of ($\Delta-\epsilon$) and ($\Delta+\epsilon$), in time units. A further determination is made as to whether the rest period is constant, increasing or decreasing.

The signals indicative of rest period duration relative to nominal rest period and the indications of whether the rest period is constant, increasing or decreasing are combined to determine line speed changes, whereby the line speed is either maintained constant, is increased by a predetermined amount, decreased by a predetermined amount, increased by an amount proportional to line speed and rate of change of the rest period, and is decreased by a function that is related to line speed and rest period rate of change. However, if it appears that an emergency situation exists or is about to arise, due to so much excess sheet being made that the sheet does or will contact the floor at accumulator station 21, the line speed is decreased on an emergency basis. In particular, in response to the rest period increasing and the rest period duration exceeding the deadband, the presence of an emergency situation is indicated and the line speed is decreased by a function that is either the product of the excess rest period duration and line speed or a predetermined maximum rate of change of line speed with respect to time, whichever quantity is smaller in absolute value.

A summary of the line speed changes which are made as a function of rest period and whether the rest period is increasing, constant or decreasing is given in Table I:

TABLE I

|  |  |  |  |  |
|---|---|---|---|---|
| Rest Period Increasing | B | B | C | D |
| Rest Period Constant | E | F | F | G |
| Rest Period Decreasing | A | B | B | B |
| | $\overline{RP} = 0$ | $\overline{RP} = (\Delta-\epsilon)$ | $\overline{RP} = \Delta$ | $\overline{RP} = (\Delta+\epsilon)$ |

When in A; $\delta V_L = a - b V_L (\partial \overline{RP}/\partial t)$ (7)
When in B, $\delta V_L = -(b V_L \partial \overline{RP}/\partial t)$ (8)
When in C; $\delta V_L = -a - b V_L \partial \overline{RP}/\partial t$ (9)
When in D; $\delta V_L = -c[\overline{RP} - (\Delta+\epsilon)] V_L$ (10)
or $-d$ (11)
whichever is smaller in absolute value
When in E; $\delta V_L = a$ (12)
When in F; $\delta V_L = 0$ (13)
When in G; $\delta V_L = -a$ (14)

where:
a = a predetermined constant for line speed change, typically 0.06 ft/min.
b = a predetermined constant for derivative line speed damping
$(\partial(\overline{RP})/\partial t)$ = rate of change of filtered rest period, approximated as current filtered rest period minus filtered rest period removed in time two previous basic computation cycles
$\overline{RP}$ = filtered rest period
C = predetermined constant indicative of deceleration gain factor
d = predetermined constant indicative of maximum line speed decrease per computation cycle for excess material reduction The change in line speed for each of the different conditions indicated by Table I is accompanied by a change in screw speed, $\delta V_S = \delta V_L (\partial V_S/\partial V_L)$ which maintains sheet thickness constant despite the line speed changes. In Table I, the vertical lines represent rest period duration boundaries and rest period duration increases from left to right; e.g., if the rest period duration is between the values of O ($\Delta-\epsilon$) while the rest period decreases, the system is in state A and line speed changes are determined by Equation (7); if the rest period duration is greater than ($\Delta+\epsilon$) while the rest period is constant, the system is in state G and line speed changes are determined by Equation (14).

The determination of the line and screw speed changes, $V_L$ and $V_S$, for phase two operation is performed by computer 111, which is responsive to multibit, parallel, binary, digital signals indicative of the rest period, RP, of dancer roll 23 line speed, $V_l$, of sheet 11, and the rate of change of screw speed with respect to line speed, ($\delta V_s/\delta V_l$), output signal of computer 88. The latter two input signals to computer 111 are fed to the computer once each basic computation cycle time of the computer through switches 87' and 114.

A particular embodiment of the apparatus which may be included in computer 111 is illustrated in FIG. 3. The computer illustrated in FIG. 3 first determines in which one of the possible seven states of Table 1 the rest period lies. After an evaluation of the rest period state, calculations are made for the values of $\delta V_l$, and the calculated value of $\delta V_l$ is combined with the rate of change of screw speed with respect to line speed to derive an indication of the change in screw speed to achieve constant sheet thickness.

The state determination is made by supplying the measured rest period signal derived from register 40, FIG. 2, to a network for determining the rest period rate of change. To this end, the output signal of register 40 is supplied to digital filter 120 that is the same as filter 58. The output signal of digital filter 120 is supplied to delay element 122, having a delay period of two basic computation cycles. Binary, multi-bit, parallel output signals of delay element 122 and filter 120 are coupled once each basic computation cycle through switches 123 and 124 as minuend and subtrahend input signals to subtraction matrix 125, which derives a binary, parallel, multi-bit output signal having a polarity indicating bit and a number of magnitude indicating bits for the magnitude of ($\overline{RP} - \overline{RP}_{t-2}$), where:

$\overline{RP}$ = the filtered rest period, and $\overline{RP}_{t-2}$ = the filtered rest period two computation cycles previously removed.

The output signal of matrix 125 has a magnitude approximately proportional to the rate of change of rest period with respect to time, and a polarity indication for whether the rest period is increasing or decreasing. The signal derived from matrix 125 is applied to a digital polarity detector 126, having three output leads 127, 128 and 129. Detector 126 responds to the polarity indicating bit to indicate that its input is negative or positive; the detector also responds to the magnitude indicating bits to detect a zero value. In response to a zero value being detected, detector 126 overrides the indication that its input is positive and indicates the zero level. Binary one levels are derived on leads 127, 128 and 129 in response to the input signal of the detector 126 being positive, zero and negative, respectively, thereby to indicate that the rest period is increasing, constant and decreasing.

To derive an indication as to whether the rest period is within the deadband, and on which side of the nominal value, the rest period indicating output signal of filter 120, coupled through sampling switch 123 once each basic computation cycle, is applied in parallel to one input of each of comparators 121, 131, 132 and 133. Each of comparators 121, 131, 132 and 133 includes a further input respectively responsive to a different, parallel, multi-bit binary signal, having values commensurate with the magnitudes of $\delta$, ($\Delta-\epsilon$), $\Delta$ and ($\Delta+\epsilon$). In response to the rest period magnitude supplied to comparators 131 and 132 being less than the magnitudes of ($\Delta-\epsilon$) and $\Delta$ respectively, comparators 131 and 132 derive binary one levels. In contrast, comparators 121 and 133 respectively derive binary one output signals in response to the magnitude of the rest period exceeding the magnitude of the predetermined rest period durations $\delta$ and ($\Delta+\epsilon$). As previously indicated, the output of comparator 121 is supplied to flip-flop 78.

To determine in which of the four different regions of Table I the filtered rest period lies, the binary one output signals of comparators 131, 132, and 133 and polarity detector 126 are combined in a network including inverters 136–138 and AND gates 141–150. To derive a binary one level to indicate that the filtered rest period is between $\Delta$ and ($\Delta+\epsilon$), the binary one output levels of comparators 132 and 133 are fed respectively to inverters 137 and 138, the outputs of which are coupled to AND gate 146.

The output signals of comparators 131 – 133, AND 146 and inverter 136 are combined with the signals derived from detector 126 to determine in which of the seven states of Table I the system is operating. An indication that the system is in state C is derived by combining the output signal of polarity detector 126 on lead 127 with the output signal of AND gate 146 in AND gate 141, whereby a binary one signal is derived from AND gate 141 in response to the rest period being within the deadband and above the nominal value, while the rest period is increasing. Detection of emergency state D is derived by combining the output of comparator 133 with the signal on lead 127 in AND gate 142, which thereby derives a binary one level indicative of the filtered rest period exceeding the deadband while the rest period is increasing. An indication that the system is in state A is derived by combining the signal derived by polarity detector 126 on lead 129 with the output signal of comparator 131 in AND gate 143, which thereby derives a binary one signal in response to the filtered rest period being less than the nominal value while the rest period is decreasing. To indicate state F, the signals derived from polarity detector 126 on lead 128 and AND gate 146 are combined in AND gate 144 which thereby derives a binary one level in response to the filtered rest period being above the nominal value and in the deadband, while the rest period is not changing. The output signals of polarity detector 126 on lead 128 and comparator 133 are combined in AND gate 145 which derives a binary one signal while the system is in state G, to indicate that the filtered rest period exceeds the deadband while the rest period is being held constant.

An indication that the system is in state E is derived by supplying the output signal of comparator 132 and one input of AND gate 147, the other input of which is responsive to the output signal of polarity detector 126 on lead 128. Thereby, AND gate 147 derives a binary one signal in response to the rest period being constant while the filtered rest period is less than the nominal value. An indication that the system is in state B is derived by combining the output signal of comparator 132 with the output of detector 126 on lead 127 in AND gate 148, which derived an output signal that is supplied to one input terminal of OR gate 149, having a second input terminal responsive to the signal derived from polarity detector 126 on lead 129. A second input of AND gate 150 is derived from inverter 136, which is in turn responsive to the output signal of comparator 132. Thereby, OR gate 149 derives a binary one output signal in response to the rest period increasing while the filtered rest period is less than a nominal value or in response to the rest period decreasing while the filtered rest period is greater than the minimum deadband value.

From the foregoing it is apparent that binary one signals are derived from gates 141, 142, 143, 144, 145, 147 and 149 on a mutually exclusive basis to indicate the seven different states set forth by Table I. These binary one signals control which of the seven possible values of $\delta V_L$ are to be employed.

With the system in state A, Equation (7), Table I, is solved to determine the value of $\delta V_L$. To this end, the expression of Equation (7) is implemented by combining in adder matrix 162 a multi-bit, parallel binary signal indicative of the predetermined value, $a$, as derived from source 161, with a binary signal indicative of $-bV_L(\delta RP/\delta t)$ as derived from multiplication matrix 163. One input signal, approximately equal to $(\delta RP/\delta t)$, for matrix 163 is derived from matrix 125. The other input signal of matrix 163, $-bV_L$, is derived by supplying a parallel, multi-bit binary, signal having a predetermined value representing -b from register 165, to one input terminal of multiplication matrix 164, having a further binary input signal indicative of the filtered line speed, $V_L$, as coupled once each basic computation cycle through switch 87'. The signal derived from adder matrix 162 is selectively coupled through normally open switch 166 in response to the system being in state a, as indicated by a binary one output of AND gate 143, the output terminal of which is connected to a control input terminal of switch 166, whereby the switch is activated to the closed state in response to a binary one output of AND gate 143. The signal coupled through switch 166 is applied to lead 167 and thence is fed to network 96 through switch 168 in response to a binary one output of flip-flop 78 being derived at terminal 81.

To provide for concomitant control of screw speed and thereby maintain the thickness of sheet 11 constant, the change in line speed indicating signal on lead 167 is combined with the output signal of computer 88 as coupled through switch 114 in multiplier matrix 168 which derives an output signal indicative of $\delta V_{s3}$. The $\delta V_{s3}$ signal derived from multiplier matrix 169 is coupled through switch 170 as an input to network 96 in response to a binary one output signal being derived at terminal 81 of flip-flop 78 to indicate that the system is in phase two operation.

With the system in state B, the line speed change is computed in accordance with Equation (8) and the resultant is fed through switch 174. Thereby, the output signal of multiplier 163 is selectively fed through normally open switch 174 that includes a control input terminal responsive to the output of OR gate 149, whereby switch 174 is closed in response to the OR gate deriving a binary one level.

With the system in state C, the line speed change is calculated in accordance with Equation (9). To this end, the output signal of source 161, indicative of the predetermined constant a, is reversed in polarity in network 175, the output signal of which is combined in addition matrix 176 with the output signal of multiplier 163. Addition matrix 176 thereby derives a binary signal having a magnitude and polarity represented by Equation (9), which signal is fed through normally open switch 177 to lead 167 in response to the switch 177 being closed when a binary one level is derived from AND gate 141.

When the system is in states E and G, the signal from source 161, representing the predetermined constant a, is respectively fed through switches 178 and 179 with the same and opposite polarities as the signal derived from source 161. To this end, the output signal of source 161 is directly applied to one input terminal of switch 178 having an input terminal responsive to the output signal of AND gate 147, whereby switch 178 is closed and a binary signal representing the value of a is coupled to lead 167. The $-a$ output signal is selectively coupled to lead 167 by connecting the output signal of polarity inverter 175 to normally open switch 179, having a control input terminal responsive to the output of AND gate 145. Switch 179 is closed in response to a binary one output of gate 145.

When the system is in state F, no change in line speed is to be made, whereby a multi-bit, parallel binary signal representing zero, as derived from source 181, is coupled through normally open switch 182 to lead 167. To this end, switch 182 has a control input terminal connected to be responsive to the binary level derived from AND gate 144. When a binary one is derived from gate 144, switch 182 is closed and the signal from source 182 is coupled to lead 167.

When the system is in state D, the signal coupled to lead 167 has a magnitude represented by Equation (10) or (11), whichever is smaller in absolute value. To this end, a multibit, parallel, binary signal representing the predetermined constant, $-d$, is derived from source 193 to represent Expression (11). To derive a signal indicative of the magnitude represented by Expression (10), signals indicative of the filtered rest period, $\overline{RP}$, as coupled through switch 123, and $(\Delta+\epsilon)$ are respectively applied to subtrahend and minuend inputs of subtraction matrix 192. The output signal of subtraction matrix 192 and the filtered line speed, as coupled through switch 87', are combined in multiplication matrix 196. Matrix 196 thereby derives a multi-bit, parallel binary signal representing the predetermined constant $(-c)$, as derived from source 198; the output signal of matrix 197 thereby represents Expression (10). The output signals of matrices 193 and 197 are applied to comparison network 199 which has a pair of binary output terminals 201 and 202. A binary one level is derived on terminal 201 in response to the output signal of matrix 193 being less than or equal in absolute value to the value of the signal derived from matrix 197. In contrast, a binary zero lever is derived from comparator 199 on lead 201, while a binary one signal is derived on lead 202 in response to the absolute value of the signal derived from matrix 197 being less than the absolute value of the signal derived on lead 193.

A binary one output signal on lead 201 is applied to the control input of normally open switch 203, having a further input responsive to the output signal of matrix 193. Conversely, a binary one output signal on lead 202 is applied to the control input of normally open switch 204, that is also responsive to the signal derived from multiplier matrix 197. Thereby, switches 203 and 204 respectively derive signals indicative of the values of expressions (11) and (10), depending upon which expression is smaller in absolute value. The signal derived from one of switches 203 and 204 is coupled to an input of normally open switch 205. Switch 205 is closed in response to a binary one signal being applied to a control input terminal thereof which is connected to the output signal of AND gate 142; the output signal of switch 205 is applied to lead 167.

As indicated supra, one of the signals representing $\delta V_L$ is selectively coupled through switches 166, 174, 177, 178, 179, 182, and 205 to lead 167 and the signal on lead 167 is combined with the ($\delta V_S/\delta V_L$) signal to derive the signal representing $\delta V_{S3}$.

Under normal operation, signals representing the values of $\delta V_{S1}$ and $\delta V_{L1}$, as coupled through switches 97 and 98, or the values of $\delta V_{L3}$ and $\delta V_{S3}$, as coupled through switches 168 and 170, are supplied by throughput control priority logic network 96 to inputs of line speed controller 101 and addition matrix 107. However, when safety conditions are exceeded, the $\delta V_{S1}$ and $\delta V_{L1}$ or $\delta V_{S3}$ and $\delta V_{L3}$ signals are not supplied to matrix 107 and controller 191. To detect the safety conditions, network 96 responds to signals derived from sheet detecting contacts 35, the current supplied to motor 18 which indicates the load on screw 14, and transducers monitoring screw speed and the head pressure in die 16.

When safety conditions are detected, operation continues but no attempt at throughput maximizing is made, although sheet thickness is maintained constant. To this end, logic network 96 is responsive to signals for the values of $\delta V_S$ and $\delta V_L$ as derived from line down and throughput limit safety networks 222 and 224.

Figures 4, 7:
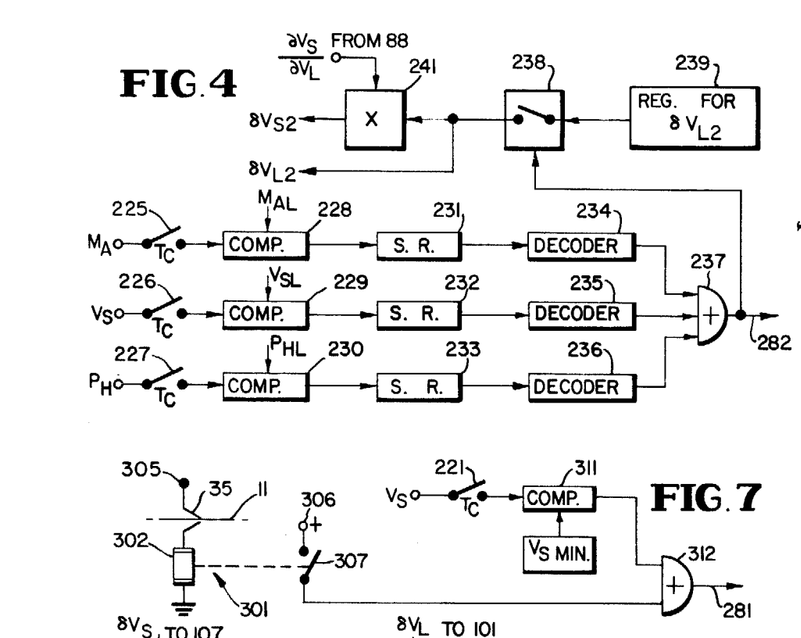
FIG. 4 is a schematic diagram of a throughput limit safety circuit included in the FIG. 1 system.
FIG. 7 is a schematic diagram of a line down alarm circuit included in the system of FIG. 1.

Line down circuit 222, specifically illustrated in FIG. 7, responds to the closure of contacts 35 while the system is in automatic operation by deriving zero values for the signals $\delta V_{S4}$ and $\delta V_{L4}$. The $\delta V_{S4}$ and $\delta V_{L4}$ signals are respectively applied to controller 101 and matrix 107 to prevent changes in the screw speed and line speed. To this end, network 222 includes relay 301 having a coil 302 and normally open contact 307. One terminal of contact 307 is connected to a voltage supply 306, while the other terminal is connected through OR gate 312 to lead 281 which is coupled to network 96 to cause the values of $\delta V_{L4}$ and $\delta V_{S4}$ to be set to zero and prevent the coupling of other $\delta V_L$ and $\delta V_S$ signals to controller 101 and matrix 107.

Network 222 also responds to the screw speed being excessively slow, as indicated by feeding the filtered screw speed value through switch 221 once each basic computation cycle, to derive zero values for the signals $\delta V_{S4}$ and $\delta V_{L4}$. The $\delta V_{S4}$ and $\delta V_{L4}$ signals are respectively applied to controller 101 and matrix 107 to prevent changes in the screw speed and line speed. In response to slow screw speed being detected network 222 supplies a control signal to network 96 to enable the $\delta V_{L4} = \delta V_{S4} = 0$ signals to be coupled through network 96 to the exclusion of all other $\delta V_L$ and $\delta V_S$ signals. To these ends, network 222 includes a comparison network 311 responsive to the $V_S$ signal coupled once each basic computation cycle through contact 221, as well as to a parallel, multi-bit binary signal having a predetermined value indicative of minimum safe speed for screw 14, $V_{Smin}$. In response to $V_S$ being less than $V_{Smin}$, comparator 311 derives a binary one signal which is coupled to network 96 to cause the values of $\delta V_{L4}$ and $\delta V_{S4}$ to be set to zero and prevent the coupling of other $\delta V_L$ and $\delta V_S$ signals to controller 101 and matrix 107.

In response to any of (1) the current of motor 18, (2) screw speed, or (3) the head pressure of die 16 exceeding predetermined maximum limits, respectively denominated as $M_{IL}$, $V_{SL}$, or $P_{HL}$, for a predetermined time period, throughput limit safety network 224 derives a predetermined signal indicative of line speed change, $\delta V_{L2}$, and a coordinated value of screw speed change, $\delta V_{S2}$. The $\delta V_{L2}$ and $\delta V_{S2}$ output signals of network 224 are coupled through priority logic network 96 to controller 101 and matrix 107 unless a line down safety condition is detected by network 222; thereby the $\delta V_{L2}$ and $\delta V_{S2}$ signals derived from network 224 are coupled through network 96 to the exclusion of the $\delta V_{S1}$ and $\delta V_{L1}$ or the $\delta V_{S3}$ and $\delta V_{L3}$ signals. To these ends, the filtered values of $M_A$, $V_S$, and $P_H$, are coupled to network 224 through switches 225, 226 and 227 once each computation cycle. The signals coupled through switches 225, 226 and 227 are respectively compared with binary signals indicative of the limit values, $M_{IL}$, $V_{SL}$ and $P_{HL}$ in comparators 228, 229 and 230, which derive binary one signals in response to the monitored variables exceeding the limit values. The output signals of comparators 228–230 are respectively coupled to three stage shift registers 231–233, each of which is advanced once each basic computation cycle. Thereby, in response to the monitored value exceeding the limit value for three successive computation cycles, a binary one signal is in each of the stages of one of the shift registers, and this binary one signal is detected by decoders 234–236, respectively, whereby the decoders derive a binary one output signal indicating the monitored value exceeding the limit value to signal a safety condition being exceeded.

The output signals of decoders 234–236 are combined in OR gate 237, which derives a binary one output that is coupled as a control input to close normally open switch 238 having a multi-bit, parallel binary input from source 239 representing a predetermined value for the magnitude of $\delta V_{L2}$. The $\delta V_{L2}$ signal is fed through switch 238 to multiplier matrix 241, having a second input responsive to the rate of change of screw speed with respect to line speed output signal of computer 88, as coupled once each basic computation cycle through switch 114. The output signals of switch 238 and matrix 241 are thereby representative of the values of $\delta V_{L2}$ and $\delta V_{S2}$ to achieve coordinated changes in the screw speed and line speed to maintain sheet thickness substantially constant. The output of OR gate 237 is also applied as an input to priority logic network 96 to enable the output signal of switch 238 and multiplier matrix 241 respectively to be applied to controller 101 and matrix 107 to the exclusion of the $\delta V_{S1}$ or $\delta V_{L1}$ or $\delta V_{S3}$ or $\delta V_{L3}$ signals.

Figure 5:
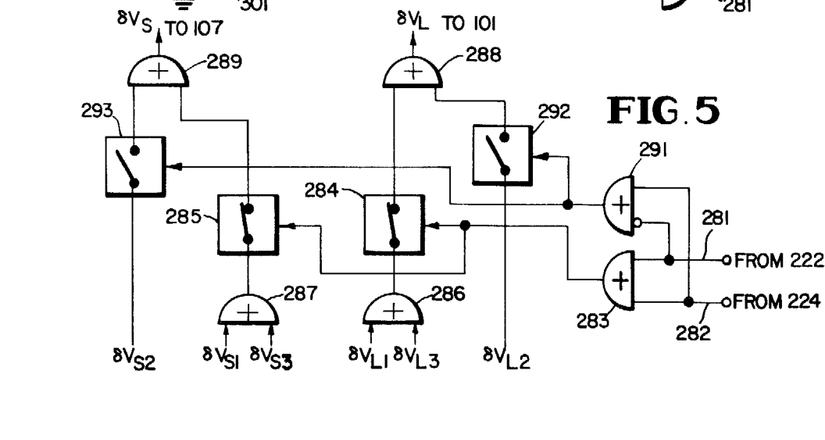
FIG. 5 is a schematic diagram of the throughput priority logic circuit included in the FIG. 1 system.

To provide the necessary controls as indicated supra, priority logic network 96 includes gates and switches for selectively feeding the four different sets of inputs thereto to line speed controller 101 and matrix 107. To this end, the output signal of OR gate 312 in line down safety network 222, indicative of the line being in a down condition when it has a binary one value, is supplied to network 96 on lead 281, while the output of OR gate 237 is supplied to network 96 on lead 282. The signals on leads 281 and 282 are combined in OR gate 283, having an output which is connected to control input terminals of normally closed switches 284 and 285. Switches 284 and 285 include signal input terminals respectively responsive to the output signals of wire or circuits 286 and 287 and indicative of the values of $\delta V_{L1}$ and $\delta V_{S1}$ or $\delta V_{L3}$ and $\delta V_{S3}$, whichever pair of signals is coupled through switches 97 and 98 or 168 and 170. Thereby, in response to the safety for neither network 222 nor 224 being exceeded, signals are coupled through switches 284 and 285 to provide line speed and screw speed changes for phase one or phase two operation. The signals coupled through normally closed switches 284 and 285 are respectively applied to OR gates 288 and 289 on which are derived the $\delta V_L$ and $\delta V_s$ signals.

To sense that a limit safety has been detected by network 224 to the exclusion of network 222, the signals on leads 281 and 282 are supplied to input terminals of inhibit gate 291. In particular, gate 291 includes an inhibit input terminal responsive to the signal on lead 281, and a selectively gated input terminal connected to be responsive to the signal on lead 282. Thereby, a binary one signal is derived from gate 291 only in response to a binary one signal being derived from OR gate 237 and no binary one signal being derived from comparator 311 in network 222. The output signal of gate 291 is coupled in parallel to control input terminals of normally open circuited switches 291 and 293, having input signal terminals responsive to signals commensurate with the values of $\delta V_{L2}$ and $\delta V_{s2}$. The signals coupled through switches 292 and 293 are supplied to OR gates 288 and 289 and thence to controller 101 and matrix 107.

In the event of a binary one signal being derived from OR gate 312 in network 222 and a binary one signal being derived from the output of OR gate 237 in network 224, to indicate that safety conditions are detected by networks 222 and 224, or in response to the comparator of network 222 deriving a binary one value to the exclusion of OR gate 237, binary one and zero values are respectively derived from OR gate 283 and inhibit gate 291. The binary one output of OR gate 283 causes normally closed switches 284 and 285 to be open circuited, while the binary zero output signal of inhibit gate 291 causes normally open switches 292 and 293 to remain in the open circuited condition. Thereby, no binary signals are applied to OR gates 288 and 289 and these OR gates derive binary signals having zero magnitude. The zero magnitude signals derived from OR gates 288 and 289 are coupled to controller 101 and matrix 107, thereby preventing changes in the screw speed and line speed.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A device for measuring the speed of a sheet continuously derived from a machine relative to the speed at which the sheet is fed through an intermittently activated processing station in line with the machine comprising a variable sheet accumulator between the machine and sheet, the two speeds and the accumulator being such that the accumulator is normally adapted to have a rest state immediately prior to the sheet being supplied to the processing station, and means for measuring the duration of the rest state.

2. Apparatus for controlling the feed rate of a sheet continuously derived from a supply source and intermittently fed to an intermittently activated, in-line processing station via a sheet accumulator between the source and the station, said accumulator including a dancer roll, comprising means for controlling the intermittent feed of the sheet to the station so that the dancer roll assumes a rest state each time the station is activated, means for measuring the rest state duration, and means for deriving a control signal for the continuous feed rate in response to the measured rest state duration.

3. A system for controlling a machine continuously deriving a sheet that is fed to an intermittently activated, in-line processing station comprising means for measuring the speed of the sheet derived from the machine relative to the speed of the sheet in the processing station, said means for measuring including a variable sheet accumulator between the machine and the station, the two speeds and the accumulator being such that the accumulator is normally adapted to have a rest state immediately prior to the sheet being supplied to the station, means for measuring the duration of the rest state, means for deriving a first indication of whether the rest period is constant or changing and for indicating the direction of change and for deriving a second indication of the magnitude of the relative speed, and means responsive to the first and second indications for deriving a control signal for the sheet feed rate.

4. The system of claim 3 wherein the control signal deriving means includes means responsive to the indications for selectively increasing and decreasing the control signal magnitude by fixed amounts.

5. The system of claim 4 wherein the control signal deriving means includes means for measuring the speed of the continuously derived sheet, and means responsive to the indications for selectively controlling the magnitude of the control signal as a function of the measured sheet speed.

6. The system of claim 4 wherein the control signal deriving means includes means for measuring the speed of the continuously derived sheet, and means responsive to the indications for selectively controlling the magnitude of the control signal in response to the magnitude of the measured sheet speed and the rate of change of rest period.

7. The system of claim 6 further including means for deriving signals indicative of established predetermined boundaries for the relative speed values, means responsive to the signals indicative of the boundaries and the second indication for deriving a further indication of between which of the boundaries the measured relative value lies, and means responsive to the first and further indications for selecting whether the control signal has (a) no effect on the sheet feed rate, (b) causes the sheet feed rate to increase or decrease by a fixed amount, or (c) causes the sheet feed rate to increase or decrease by an amount indicative of the measured sheet speed and the rate of change of measured sheet speed.

8. The system of claim 7 wherein the means for deriving the further indication includes means for signalling an excess sheet alarm condition in response to the first indication indicating that the rest period is increasing and that the second indication indicating that the relative sheet speed is above a predetermined value, and means responsive to the alarm condition for selecting a control signal amplitude that causes the sheet feed rate to decrease by an amount proportional to the product of measured sheet speed and the second indication or the rate of change of sheet speed, whichever is greater.

9. The system of claim 3 wherein the control signal deriving means includes means for measuring the speed of the continuously derived sheet, and means responsive to the indications for selectively controlling the magnitude of the control signal as a function of the measured sheet speed.

10. The system of claim 3 wherein the control signal deriving means includes means for measuring the speed of the continuously derived sheet, means for signalling an excess sheet alarm condition in response to the first indication indicating that the rest period is increasing and the the second indication indicating that the relative sheet speed is above a predetermined value, and means responsive to the alarm condition for selecting a control signal amplitude that causes the sheet feed rate to decrease by an amount proportional to the product of measured sheet speed and the first indication or a predetermined constant, whichever is smaller in absolute value.

11. A system for controlling an extruder continuously deriving a sheet that is intermittently supplied to an intermittently activated, in-line processing station via a variable accumulator, said accumulator adapted to have a rest state immediately prior to the sheet being supplied to the processing station, said extruder including means for feeding material to a sheet former and means for taking sheet material away from the former, the sheet being in a relatively soft state as it is taken away from the former so that the speed with which the sheet is taken away from the former affects the sheet thickness, the sheet being in a relatively set state as it passes through the accumulator so that the speed of the sheet as it moves through the accumulator has no substantial effect on sheet thickness, comprising means for measuring the rest state time to derive a first signal indicative of the take-away speed relative to the speed with which the sheet moves through the processing station, means for measuring the activation rate of the processing station to derive a second signal indicative of the activation rate, means for measuring the thickness of the sheet in the set state to derive a third signal indicative of the measured thickness, and means responsive to said first, second and third signals for deriving control signals for the speed of the means for feeding and the means for taking away so as to control the take-away speed.

12. The system of claim 11 wherein the control signal deriving means includes a variable sheet accumulator between the machine and the station, the two speeds and the accumulator being such that the accumulator is normally adapted to have a rest state immediately prior to the sheet being supplied to the station, means for measuring the duration of the rest state, means for deriving a first indication of whether the rest period is constant or changing and for indicating the direction of change and for deriving a second indication of the magnitude of the relative speed, and means responsive to the first and second indications for deriving a control signal for the take-away speed.

13. A system for controlling a machine that continuously derives a sheet and feeds it to an in-line intermittently activated processing station where the sheet is in a set state, the machine including means for controlling the feed rate of material forming the sheet, the sheet thickness being affected by the sheet and material feed rates, the sheet being intermittently advanced for the machine to the station via a variable accumulator, comprising means for measuring the relative speeds of the sheet derived from the machine and in passing through the station, means for measuring the thickness of the sheet, and means responsive to both of the measuring means for deriving control signals for the feed rate of the sheet and the feed rate of the material, said means for deriving control signals including means for measuring the activation rate of the station, means comparing the measured activation rate with a setpoint value therefor for deriving first and second indications respectively indicative of the measured rate exceeding and being less than the setpoint value therefor, means responsive to the first indication for deriving a first control signal for the speed of the sheet derived from the machine, said first control signal having a magnitude dependent on the relative values of the measured rate and the setpoint value therefor, and means responsive to the second indication for deriving a second control signal for the speed of the sheet derived from the machine, said second control signal having a magnitude dependent on the speed of the sheet as it is derived from the machine relative to the speed of the sheet at the station, said means for deriving control signals while the second indication is being derived including a variable sheet accumulator between the machine and the station, the two speeds and the accumulator being such that the accumulator is normally adapted to have a rest state immediately prior to the sheet being supplied to the station, means for measuring the duration of the rest state, means for deriving a third indication of whether the rest period is constant or changing and for indicating the direction of change and for deriving a fourth indication of the magnitude of the relative speed, and means responsive to the third and fourth indications for deriving a control signal for the sheet feed rate.

14. A system for controlling a machine that continuously derives a sheet and feeds it to an in-line intermittently activated processing station where the sheet is in a set state, the machine including means for controlling the feed rate of material forming the sheet, the sheet thickness being affected by the sheet and material feed rates, the sheet being intermittently advanced from the machine to the station via a variable accumulator, comprising means for measuring the relative speeds of the sheet derived from the machine and in passing through the station, means for measuring the thickness of the sheet, and means responsive to both of the measuring means for deriving control signals for the feed rate of the sheet and the feed rate of the material, said control signal deriving means including a variable sheet accumulator between the machine and the station, the two speeds and the accumulator being such that the accumulator is normally adapted to have a rest state immediately prior to the sheet being supplied to the station, means for measuring the duration of the rest state, means for deriving a first indication of whether the rest period is constant or changing and for indicating the direction of change and for deriving a second indication of the magnitude of the relative speed, and means responsive to the first and second indications for deriving a control signal for the sheet feed rate.

15. A method of controlling the feed rate of a sheet continuously derived from a supply source and intermittently fed to an intermittently activated, in-line processing station via a sheet accumulator between the source and the station, said accumulator including a dancer roll, comprising controlling the intermittent feed of the sheet to the station so that the dancer roll assumes a rest state each time the station is activated, and controlling the continuous feed rate in response to the measured rest state duration.

16. The method of claim 15 wherein the continuous feed rate is controlled so that the dancer roll rest state duration lies in a predetermined range of values greater than zero such that excess sheet is derived from the source.

17. A method of controlling a machine continuously deriving a sheet that is fed to an intermittently activated, in-line processing station via a variable sheet accumulator between the machine and the station, the two speeds and the accumulator being such that the accumulator is normally adapted to have a rest state immediately prior to the sheet being supplied to the station, comprising measuring the duration of the rest period to derive a first indication of the speed of the sheet derived from the machine relative to the speed of the sheet in the processing station, deriving a second indication of whether the rest period is constant or changing and for indicating the direction of change, and controlling the sheet feed rate in response to the first and second indications.

18. The method of claim 17 further including the step of measuring the speed of the continuously derived sheet, and controlling the sheet feed rate as a function of the measured sheet speed in response to the indications.

19. The method of claim 17 further including the steps of establishing predetermined boundaries for the relative speed values, responding to the indications of the boundaries and the first indication to derive a further indication of between which of the boundaries the measured relative value lies, responding to the second and further indications for selecting whether the control signal has (a) no effect on the sheet feed rate, (b) causes the sheet feed rate to increase or decrease by a fixed amount, or (c) causes the sheet feed rate to increase or decrease by an amount indicative of the measured sheet speed and the rate of change of measured sheet speed.

20. A method of controlling a machine that continuously derives a sheet and feeds it to an in-line intermittently activated processing station where the sheet is in a set state, the machine including means for controlling the feed rate of material forming the sheet, the sheet thickness being affected by the sheet and material feed rates, the sheet being intermittently advanced from the machine to the station via a variable accumulator, comprising measuring the relative speeds of the sheet derived from the machine and in passing through the station, measuring the thickness of the sheet, and maintaining the thickness substantially constant despite changes in the sheet feed rate by controlling the feed rate of the sheet concomitantly with the feed rate of the material in response to both of the measurements.

21. The method of claim 20 wherein the sheet feed rate is controlled by measuring the activation rate of the station, comparing the measured activation rate with a setpoint value therefor, deriving first and second indications respectively indicative of the measured rate exceeding and being less than the setpoint value therefor, in response to the first indication increasing the speed of the sheet derived from the machine by an amount dependent on the relative values of the measured rate and the setpoint value therefor, in response to the second indication controlling the speed of the sheet derived from the machine by an amount dependent on the speed of the sheet as it is derived from the machine relative to the speed of the sheet at the station.

22. The method of claim 21 wherein a variable sheet accumulator is provided between the machine and the station, the two speeds and the accumulator being such that the accumulator is normally adapted to have a rest state immediately prior to the sheet being supplied to the station, the sheet feed rate being controlled while the second indication is derived by measuring the rest period duration, deriving a third indication of whether the rest period duration is constant or changing and for indicating the direction of change, in response to the measured rest period duration, deriving a fourth indication of the magnitude of the relative speed, and controlling the sheet feed rate in response to the third and fourth indications.

23. The method of claim 20 wherein a variable sheet accumulator is provided between the machine and the station, the two speeds and the accumulator being such that the accumulator is normally adapted to have a rest state immediately prior the sheet being supplied to the station, the sheet feed rate being controlled by: measuring the rest period duration, deriving a first indication of whether the rest period is constant or changing and for indicating the direction of change, in response to the measured rest period duration, deriving a second indication of the magnitude of the relative speed, and controlling the sheet feed rate in response to the first and second indications.

24. A method of controlling an extruder continuously deriving a sheet that is intermittently supplied to an intermittently activated, in-line processing station via a variable accumulator, said accumulator adapted to have a rest state immediately prior to the sheet being supplied to the processing station, said extruder including means for feeding material to a sheet former and means for taking sheet material away from the former, the sheet being in a relatively soft state as it is taken away from the former so that the speed with which the sheet is taken away from the former affects the sheet thickness, the sheet being in a relatively set state as it passes through the accumulator so that the speed of the sheet as it moves through the accumulator has no substantial effect on sheet thickness, comprising measuring the rest state time to derive a first signal indicative of the take-away speed relative to the speed with which the sheet moves through the processing station, measuring the activation rate of the processing station to derive a second signal indicative of the activation rate, measuring the thickness of the sheet in the set state to derive a third signal indicative of the measured thickness, and concomitantly controlling the speed of the means for feeding and the means for taking away so as to control the take-away speed and maintain the sheet thickness substantially constant by responding to said first, second and third signals.

25. The method of claim 24 wherein the control signal for the take-away speed is derived by deriving a first indication of whether the rest period is constant or changing and for indicating the direction of change, deriving a second indication of the magnitude of the relative speed, and controlling the sheet take-away speed in response to the first and second indications.

* * * * *